United States Patent
Edwards

Patent Number: 6,029,988
Date of Patent: Feb. 29, 2000

[54] FENDER ATTACHMENT FOR A HARNESS RACING SULKY

[76] Inventor: Kenneth R. Edwards, 845 W. William St., Delaware, Ohio 43015

[21] Appl. No.: 09/037,475

[22] Filed: Mar. 10, 1998

[51] Int. Cl.[7] .................................................. B62D 25/16
[52] U.S. Cl. ........................................... 280/152.2; 280/63
[58] Field of Search ................................. 280/63, 152.1, 280/852, 154, 160.1

[56] References Cited

U.S. PATENT DOCUMENTS

| | | | |
|---|---|---|---|
| D. 102,374 | 12/1936 | Kraeft | 280/152.1 |
| 1,490,534 | 4/1924 | McCauley | 280/152.1 |
| 1,546,651 | 7/1925 | Green | 280/152.1 |
| 1,577,146 | 3/1926 | Pawsat | 280/152.1 |
| 3,771,810 | 11/1973 | Barnett | 280/63 |
| 4,033,598 | 7/1977 | King | 280/63 |
| 4,095,815 | 6/1978 | Mitchell | 280/63 |
| 4,863,180 | 9/1989 | Guarino et al. | 280/63 |
| 5,183,279 | 2/1993 | Acerno et al. | 280/63 |
| 5,348,328 | 9/1994 | Millington | 280/63 |
| 5,899,473 | 5/1999 | Mackenzie | 280/152.1 |

*Primary Examiner*—Lanna Mai
*Assistant Examiner*—Jeff Restifo
*Attorney, Agent, or Firm*—Mueller and Smith, LPA

[57] ABSTRACT

A fender assembly for a harness racing sulky of a variety having at least one bifurcate wheel support including a pair of downwardly-extending fork members spaced-apart to receive a wheel of a given circumference therebetween and an arcuate portion extending above the wheel intermediate the fork members. In one embodiment, a mounting bracket having an upper surface and a lower surface is attachable to the wheel support to extend above the support over the wheel. A fender is provided as having an inner and outer surface defining a generally curved periphery corresponding to the circumference of the wheel. The fender is removably fastenable with a fastener at a proximal end to the upper surface of the mounting bracket for rearward suspension over a portion of the circumference of the wheel from the proximal end to a freely-extending distal end. In a preferred embodiment, the fender assembly includes a generally T-shaped mount having a central permanent fender securement portion which extends to an outboard first portion to which is coupled a flexible strap and connector post assembly which is wrapped about the downwardly curving portion of the arch. Opposite the central fender supporting portion is a second portion which extends substantially to the point of connection of the forward shaft and arch of the sulky frame. A third portion of the mount includes a rearward hook which engages the arch and a forwardly extending stabilizer bar to which a second flexible strap connector and connector post is attached for connection with the sulky shaft.

14 Claims, 3 Drawing Sheets

FENDER ATTACHMENT FOR A HARNESS RACING SULKY

BACKGROUND OF THE INVENTION

The present invention relates generally to a mud fender attachment for a harness racing sulky or race bike which simplifies the mounting of the fender to the sulky.

In the sport of harness racing, a driver is drawn behind a horse in a two-wheeled carriage which is commonly referred to in the vernacular as a "sulky" or "race bike." Having a light-weight, generally open design, the sulky is constructed of several tubular frame members. One of these members, termed the arch, extends between the wheels for rotatably receiving each wheel, typically having a diameter of 24 or 30 inches (61 or 76 cm), within a respective outboard fork portion, and for supporting the driver at a rearward position intermediate the wheels. A pair of generally parallel shafts forwardly extend from the arch into a straddling connection with a harness which is secured to the flanks and forelegs of the horse. Control over the horse by the driver is exerted via a pair of elongate reins which extend to the driver from a bridle fitted about the head of the horse.

As in other types of horse racing, harness races often must be run in less than ideal conditions. During or after periods of inclement weather, the track, which typically is dirt or a dirt mixture, may be muddied to an extent that debris splashed from the wheels presents a hazard to following drivers and horses. It therefore is within the authority of a paddock judge to order all teams to install mud fenders to cover a rearward portion of each of the wheels.

Mud fenders heretofore have included an arrangement of struts and elastomeric straps engineered for making a three-point attachment of the fender to the arch of the sulky. However, as fenders typically are not specified for dry track conditions, and as the teams may have only a few minutes in which complete the mounting thereof, the fenders previously known in the art have proved to be a particular source of displeasure to the drivers, trainers, and others charged with their installation. Teams often have been observed to be struggling with the mounting of the fenders even as the horses are being called to the starting gate.

During the race, the minimal clearance provided between the fender and the wheel is prone after only a relatively short distance of travel to develop a packing of mud which increases the frictional forces on the wheel and contributes to a decrease in the overall speed of the team. Even without such mud packing, the fenders may be misaligned during installation or from contact with another horse or sulky causing the wheel to rub on the fender. Again, the overall speed of the team is adversely affected.

Apart from being perceived merely as an inconvenience or as contributing to poor running times, the fenders commonly in use have been discovered to have been factors in many accidents causing injuries to both drivers and horses alike. In this regard, such fenders incorporate a pair of struts, similar to those employed with bicycle fenders, for the attachment of the fender to the forks of the arch. The space between these struts and the wheel form a gap into which another horse may step and become entangled.

In view of the foregoing it will be appreciated that there has existed and remains a need for improvements in the attachment of mud fenders to harness racing sulkies. Such improvements would be well-received by drivers and trainers, and would represent an important advancement to the sport.

BROAD STATEMENT OF THE INVENTION

The present invention is directed to a mud fender attachment for a harness racing sulky or race bike and to the method for installing it. In one embodiment, the attachment provides for a secure, single-point mounting of the fender above the arch of the sulky which simplifies and expedites the removable installation of the fender. Moreover, in eliminating the struts employed with the fenders heretofore known in the art, and in increasing the clearance between the fender and the wheel, the attachment of the present invention improvements both the safety and the performance of the sulky.

One aspect of the invention involves a fender assembly for a harness racing sulky of a variety having at least one bifurcate wheel support including a pair of downwardly-extending fork members spaced-apart to receive a wheel of a given diameter therebetween and an arcuate portion extending above the wheel intermediate the fork members. A mount having an upper surface and a lower surface is attachable to the wheel support to extend above the support over the wheel. A fender is provided as having an inner and outer surface defining a generally curved periphery corresponding to the circumference of the wheel. The fender is removably fastenable with a fastener at a proximal end to the upper surface of the mount for rearward suspension over a portion of the circumference of the wheel from the proximal end to a freely-extending distal end.

In a preferred embodiment, a fender assembly is provided which includes a mount having an arched central fender supporting portion, a first portion extending outboard which is attached to the arch of the sulky utilizing a flexible polymeric strap and connector post assembly. The central fender supporting portion of the mount then extends to a second portion which is dimensioned to be positioned in adjacency with the point of connection of the sulky arch with its forwardly extending shaft. A third portion of the mount then includes a strap-like structure having a rear hook which engages the arch in abutting relationship. The third portion also includes a stabilizer bar which extends forwardly along the sulky shaft, and is connected thereto by a second flexible polymeric strap and connector post assembly. A highly stable securement of the fender assembly is thus realized, and the interval of time required for mounting is very short, i.e. less than about ten seconds.

Advantages of the present invention include a fender attachment for a harness racing sulky which allows for the removable mounting of the fender to the sulky in a minimum amount of time. Additional advantages include the provision of a single-point fender attachment which may be provided as original equipment or as retrofitted to existing sulkies. Further advantages include a secure fender attachment which provides greater clearance between the wheel to mitigate misalignments and mud packing therebetween, and which eliminates the struts heretofore typical in the art for improved safety. These and other advantages will become readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
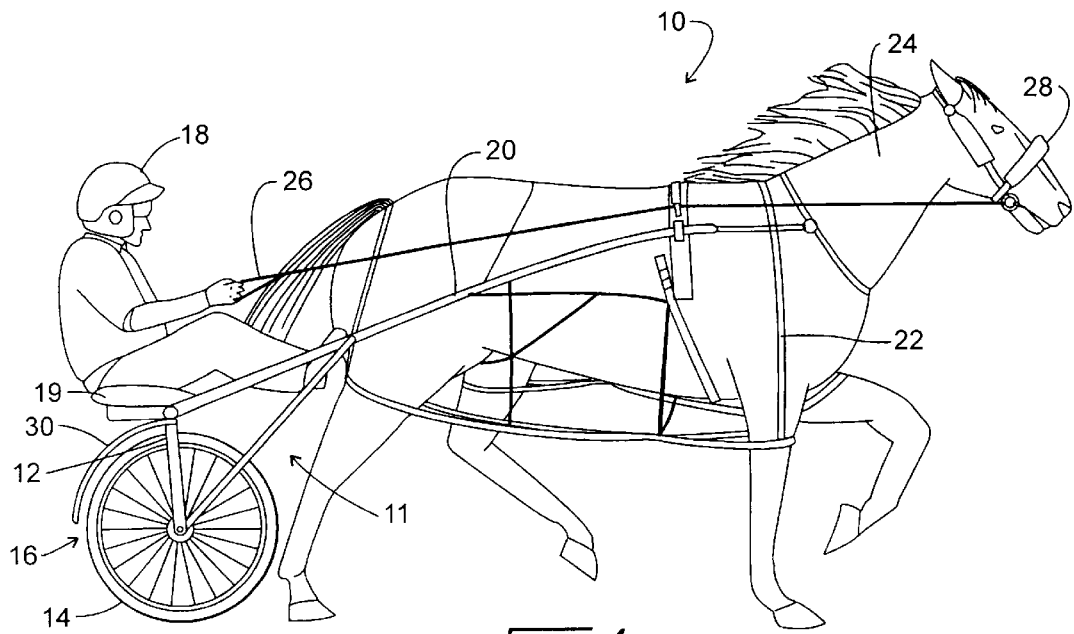
FIG. 1 is a side view of a representative harness racing sulky to which has been mounted one embodiment of a fender assembly of the present invention.

Referring to the figures wherein like parts are designated with like reference numerals, a representative harness racing sulky or race bike is shown generally at 10. Sulky 10 has a light-weight, generally open design incorporating a tubular frame, 11, which includes an arch, 12. Arch, 12, extends between the wheels, one of which is shown at 14, for rotatably receiving each wheel within a respective bifurcate wheel support, 16, and for supporting a driver, 18, at a rearward seat position, 19, intermediate the wheels. A pair of generally parallel shaft members, one of which is shown at 20, forwardly extend from a connection 13 with arch 12 into a straddling attachment with a harness, 22, strapped about the flanks and forelegs of a horse, 24. Control over horse 24 by driver 18 is exerted via a pair of elongate reins, one of which is shown at 26, which extend to the driver from a bridle, 28, fitted about the head of horse 24. In accordance with an initial embodiment of the invention, a fender assembly, 30, is removably attached to frame 11 above arch 12.

Figure 2:
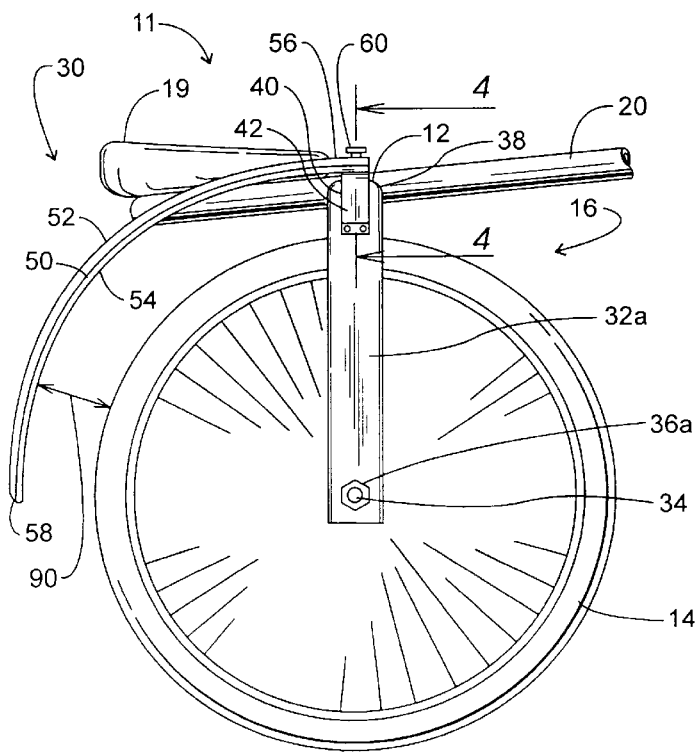
FIG. 2 is a partial side view of a wheel of the harness racing sulky of FIG. 1 showing the fender assembly of the present invention in enhanced detail.
Figure 3:
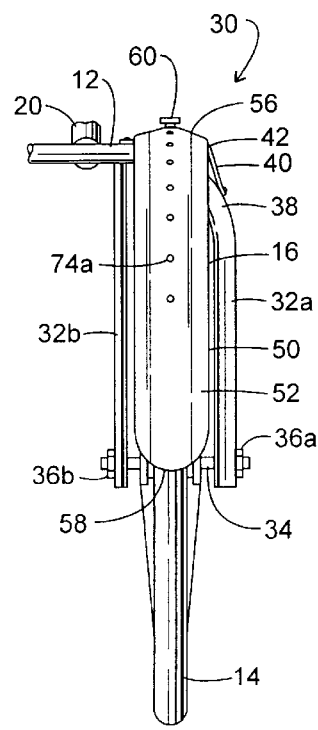
FIG. 3 is a rear view of the fender assembly of FIG. 2.

Looking next to FIGS. 2 and 3, fender assembly 30 of FIG. 1 is illustrated in enhanced detail. With particular reference to FIG. 3, bifurcate wheel support 16 may be seen to include a pair of downwardly-extending fork members, 32a and 32b, spaced-apart to receive wheel 14 of a given circumference therebetween. Fork members 32 receive an axle, 34, of wheel 14 which is secured via a pair of lugs, 36a and 36b. Although fork member 32a is shown to be formed as an integral outboard portion of arch 12, with fork member 32b being separately provided as a discrete frame member, it will be appreciated that other configurations of bifurcate wheel support 16 may be substituted without departing from the scope of the invention herein involved. Looking momentarily to FIG. 4, it may be seen that arch 12 includes an arcuate or downwardly extending curved portion 38.

Returning to FIGS. 2 and 3, fender assembly 30 is shown to include a mount, 40, having an upper surface 42 and a lower surface 44 (FIG. 4), which is attached to wheel support 16 to extend above the support over wheel 14. A fender, 50, is configured as having an inner and an outer surface, 52 and 54 (FIG. 2), respectively, which define a generally curved periphery corresponding to the circumference of wheel 14. Fender 50 is removably fastened at a proximal end, 56, to the upper surface 42 of mount 40 for rearward suspension over a portion of the circumference of wheel 14 from the proximal end 56 to a freely-extending distal end, 58. A fastener, 60, removably fastens the proximal end 56 of fender 50 to the upper surface 42 of mount 40.

Figure 4:
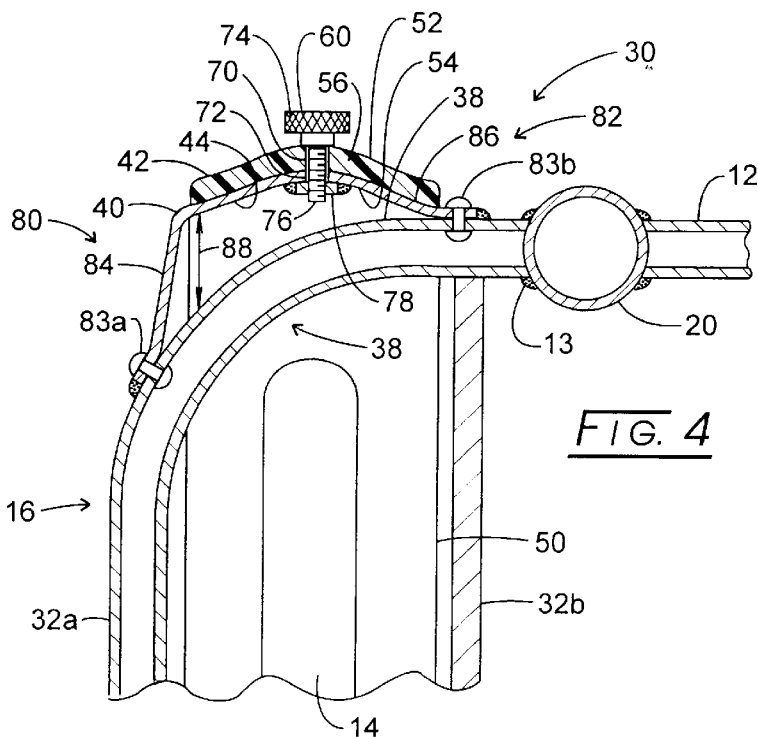
FIG. 4 is a cross-sectional view taken through the pulse 4—4 of FIG. 2 detailing the fender attachment of one embodiment of the present invention.

Referring next to FIG. 4, fender attachment 30 is shown in enhanced detail, fender 50 proximal end 56 is shown as having at least one aperture, 70, formed therethrough for registration with a corresponding hole, 72, of mount 40. With such an arrangement, fastener 60 may be received through registered aperture 70 and hole 72 for removably fastening fender 50 to mount 40. In this regard, fastener 60 may be provided as a hand-tightenable knob or wing bolt which extends from a head portion, 74, to an elongate threaded portion, 76. A retaining ring, 78, which may be a nut, lug, or the like, is configured to threadably receive the threaded portion 76 of fastener 60 for compressively engaging fender 50 proximal end 56 and mount 40 between fastener 60 head portion 74 and retaining ring 78. For ease of installation in view of the limited degree of access to inner surface 44 of mount 40, it is preferred that retaining ring 78 be brazed, bonded, or otherwise affixed thereto. Alternatively, hole 72 of mount 40 may be tapped to threadably receive fastener 60.

As discussed hereinbefore, the fenders heretofore known on the art are prone to becoming misaligned with respect to the wheel from contact with another horse or sulky as the teams jockeyed for positions during a race. To securely mount, therefore, fender 50 to mount 40, it is preferred that the upper surface 42 of mount 40 be configured in non-planar fashion as is shown to substantially conform to fender 50 inner surface 54 which defines with outer surface 52 a generally curvilinear cross-sectional profile. It will be appreciated that such an engagement is effective to delimit any lateral movement of fender 50 with respect to wheel 14.

Mount 40 is formed as a generally L-shaped bracket having an outboard first end, 80, and an inboard second end, 82, each attached to arch 12 intermediate fork members 32. As is shown in FIG. 4 at 83a–b, first and second ends 80 and 82 of mount 40 may be mechanically fastened to wheel support 16 with pop rivets or the like. Alternatively, ends 80 and 82 may be welded or otherwise bonded to support 16. To facilitate their attachment by either means, ends 80 and 82 may be flanged to better conform to the geometry of wheel support 16. The ability to effect the attachment of mount 40 to wheel support 16 via a variety of means makes assembly 30 of the present invention universally adaptable either as original equipment or as a retrofit to most of the racing sulkies of current manufacture.

With ends 80 and 82 provided for attachment to support 16, mount 40 is configured to extend from a generally upstanding outboard portion, 84, to a transverse inboard portion, 86, generally spanning the arcuate portion 38 of arch 12 and defining the upper and lower surfaces 42 and 44 of mount 40. As is shown at 88, upstanding portion 84 of mount 40 positions lower surface 44 a distance above wheel 14, the achieved spacing being effective to dispose the inner surface 54 of fender 50 a predetermined distance from the outer circumference of wheel 14. The described configuration and attachment of mount 40 therefore affords the capability to provide additional clearance, as is shown at 90 in FIG. 2, between fender 50 and wheel 14 which substantially mitigates the effects of any mud packing between the fender and the wheel. Additionally, such configuration advantageously strengthens and reinforces wheel support 16 and, particularly, arcuate portion 38 thereof. So configured, mount 40 may be stamped or otherwise formed of a metallic material such as a 3/32-inch (2.38 mm) thick sheet steel or the like. However, other configurations of mount 40, such as an upstanding, elongate nut, adapted to dispose fender 50 a predetermined distance from wheel 14 may be envisioned and therefore are to be considered within the scope of the present invention.

Returning to FIGS. 2 and 3, it may be seen that mount 40 and fastener 50 of the present invention cooperate to support fender 50 thereof in a cantilevered-arrangement over wheel 14 which obviates the needs for the struts heretofore known in the art. With fender 50 so supported, it is deflectable to a substantial degree, but is resiliently biased to return to its original orientation following any momentary contact and speed-reducing friction with wheel 14. In this regard, it is preferred that fender 50 be molded of a polymeric material having a certain resiliency.

As is shown in FIG. 3, fender 50 optionally may be provided with a plurality of radially-disposed apertures 74, one of which is designated at 74a, for respective registration with hole 76 (FIG. 4) of mount 40. Fastener 60 is receivable through each registered one of apertures 74 and hole 72 for removably fastening fender 50 to mount 40 for rearward suspension over a now variable portion of the circumference of wheel 14. As there currently is no prescribed fender length under the rules of the United States Trotting Association (USTA), the governing body of the sport, the provision of a plurality of apertures 74 affords the advantage of tailoring the length of fender 50 to meet driver preferences.

Figure 5:
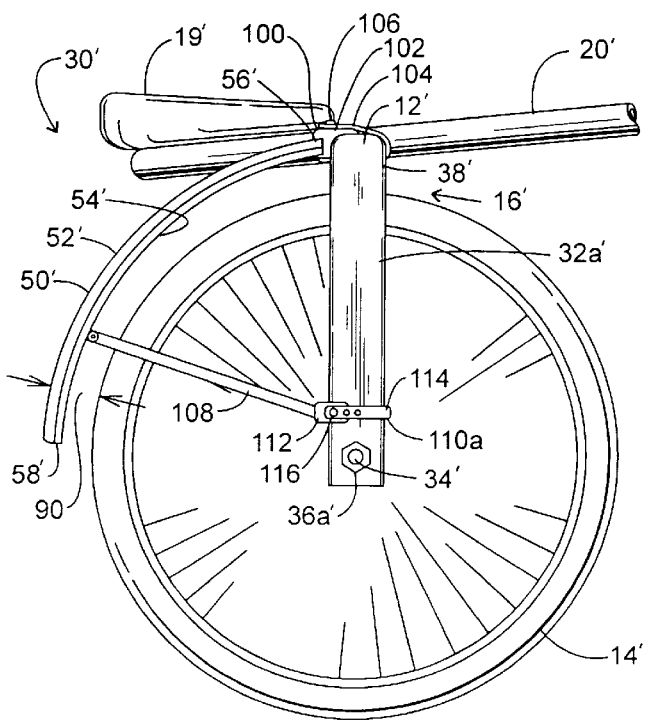
FIG. 5 is a partial side view of a harness racing sulky to which has been mounted a representative fender assembly of the prior art.
Figure 6:
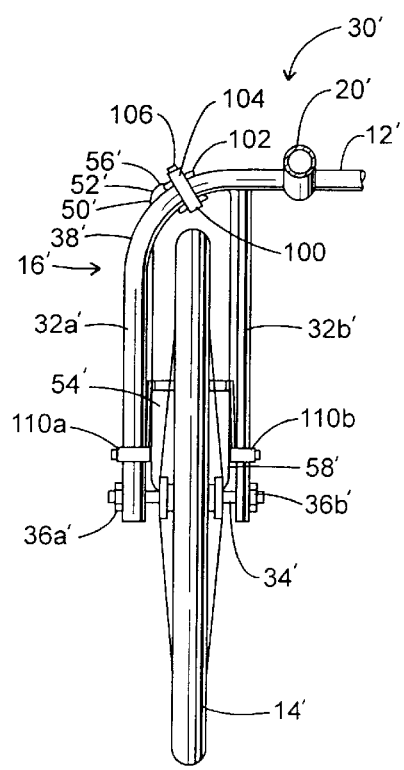
FIG. 6 is a front view of the prior art fender assembly of FIG. 5.

Looking lastly to FIGS. 5 and 6, a representative fender assembly typical of the prior art is shown for purposes of comparison at 30'. Fender assembly 30' includes fender 50' which is configured as having an inner and an outer surface, 52' and 54', respectively, defining a generally curved periphery corresponding to the circumference of wheel 14. Fender 50' is removably fastened at a proximal end, 56', to the arcuate portion 38' of wheel mount 16' with the strap assembly shown at 100. Strap assembly 100 includes a C-shaped, female support, 102, attached at one end to proximal end 56' and configured at another end to receive arcuate portion 38' of wheel support 16'. An elastomeric strap, 104, is belted around support 102 and arcuate portion 38', and is secured at a buckle, 106.

For supporting a distal end, 58', of fender 50' over wheel 14', a pair of struts, one of which is shown at 108, extend in a straddling arrangement with respect to wheel 14' from an intermediate portion of fender 50' to a respective fork 32'. As is shown at 110a and 110b (FIG. 6), each of struts 108 is fastened to a respective fork 32' with another strap assembly. In FIG. 5, strap assembly 110a may be seen to involve an arrangement similar to assembly 100. Particularly, assembly 110a includes a C-shaped, female support, 112, attached at one end to strut 108 and configured at another end to receive fork 32a'. Another elastomeric strap, 114, is belted around fork 32a' and is secured at another buckle, 116.

Assembly 30' is inherently prone to becoming misaligned, and may be permanently damaged should either of struts 108 thereof become bent. As is shown at 90' in FIG. 5, the three-point mounting arrangement of fender assembly 30' provides only minimal clearance between fender 50' and wheel which increases the susceptibility of speed-reducing mud packing therebetween. Moreover, and perhaps most importantly, struts 108 present a hazard during racing conditions, the elimination of which alone will be viewed as an important advantage of the present invention.

Figure 7:
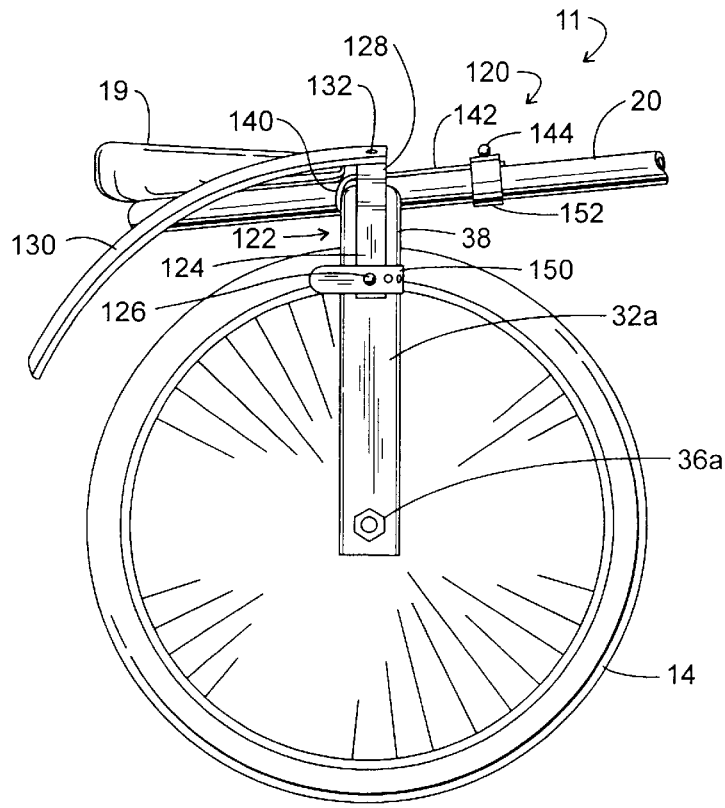
FIG. 7 is a perspective view of the mount component of a preferred embodiment for a fender assembly.
Figure 8:
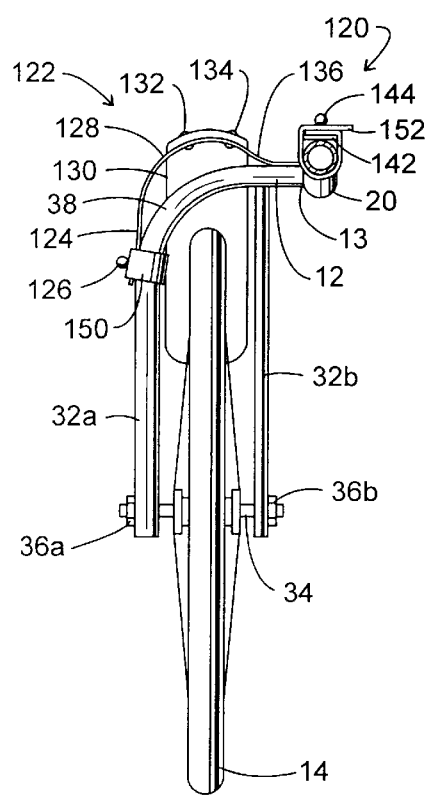
FIG. 8 is a partial side view of a harness racing sulky upon which has been mounted a fender assembly representing a preferred embodiment of the invention.
Figure 9:
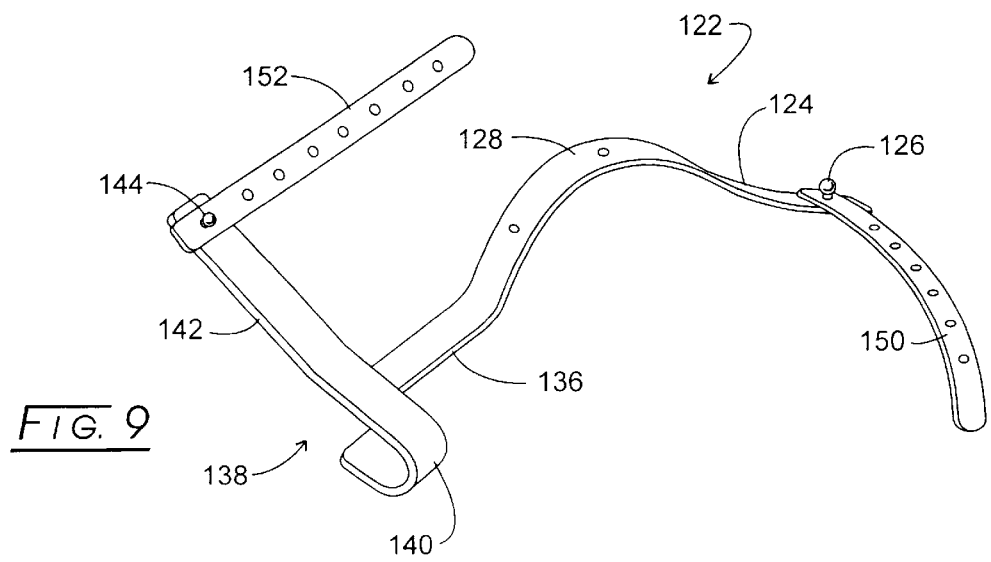
FIG. 9 is a front view of the fender assembly and sulky components of FIG. 8.

Refering to FIGS. 7, 8, and 9, a preferred embodiment for a fender assembly is represented generally at 120. Assembly 120 retains the highly advantageous aspect of being mountable upon the sulky frame within a very short time span commensurate with the mounting time required for the embodiment at 30 (i.e., less than about ten seconds). However, no permanent installation of a mount is required. In this regard, the mount component represented generally at 122 is formed of strap metal having a thickness of about ⅛ inch and a substantially greater widthwise dimension. The mount has an outboard first portion 124 which as seen in FIG. 8, is configured to nest or abut against the curved portion 38 of the arch 12. The first portion 124 also supports an upstanding connector pin 126 having a slightly enlarged retainer bead or head on it, which is seen in FIGS. 7 and 8. First portion 124 of the mount 122 is integrally formed with a next adjacent central portion 128 which functions to permanently support a light polymeric fender as seen in FIGS. 7 and 8 at 130. Attachment of fender 130 is by pop rivets or the like as seen at 132 and 134 in FIGS. 7 and 8. Note that the central portion 128 of the mount 122 is formed in an elevated curvilinear fashion such that the fender 130 is spaced adequately outwardly from the outside of wheel 14 and that it is of a curvilinear profile matching the corresponding profile of fender 130 to stabilize the fender 130 in proper position over the wheel 14. Central portion 128 of the mount 122 then is integrally formed with a second portion 136 which extends inboard of the wheel 14 a distance such that it may extend along the arch 12 to its connection 13 or point of adjacency with the elongate shaft 20. Second portion 136, in turn, is welded to a transversely disposed third portion represented generally at 138 and also seen to be formed of metal strap material having a widthwise extent greater than its thickness. Preferably, the width of first, second, and central portions 124, 136, and 128 is about one inch, with a thickness of ⅛ inch. Correspondingly, the third portion 138 is formed of strap material having a thickness of about ⅛ inch, and a widthwise extent of about ¾ inch. The third portion 138 includes a rearwardly-depending hook 140 and a forwardly extending stabilizer bar 142. Hook 140 is configured to open forwardly when mounted, and to engage a portion of the arch 12 as seen in FIGS. 7 and 8. The stabilizer bar 142 then extends forwardly in adjacency with the shaft 20 (preferably on top of the shaft), and is seen to support a second upstanding connector post 144. FIG. 9 reveals that attached to the upstanding connector post 126 is a first flexible elongate polymeric or rubber strap 150 having a linear array of holes or apertures formed in it, the aperture in one end of which is flexibly pushed or positioned over the connector post 126. In similar fashion, a second flexible elongate polymeric strap 152 having a linear array of holes or apertures formed therein is connected at one end hole or aperture to upstanding connector post 144. The procedure for mounting mount 122 and its associated fender 130 to the sulky involves the positioning of the hook 140 over arch 12 in adjacency, (preferably, just behind) with its connection to shaft 20. Stabilizer bar 142 then extends along in abutting adjacency with shaft 20. In this regard, preferably it is canted upwardly slightly during manufacture. However, its lesser width, i.e. ¾ inch, permits its manual bending adjustment by the installer. Connection with the loose end of shaft 152 then is made by tightly wrapping the strap around the shaft 20 and positioning an appropriate one of the holes therein over the connector post 144. Then, in similar fashion, the loose end of strap 150 is wrapped around the curved portion 38 of arch 12 and a similar connection is made. Note that the slightly lesser widthwise extent of the third portion 138 of mount 122 enhances the adjacent positioning of the hook 140 and bar 142. Preferably, the entire mount 122 is coated with a polymeric coating such as nylon. This coating protects the framework arch 12 and shaft 20, and functions to enhance the securement of the mount against the metal frame components of the sulky. Driving experience with the fender assembly 120 has shown it to be highly stable under the rigorous circumstances of racing, and that it is mountable in very short order once an announcement to install fenders has been promulgated.

It is anticipated that certain changes may be made in the present invention without departing from the precepts herein involved. Accordingly, it is intended that all matter contained in the foregoing description shall be interpreted as illustrative and not in a limiting sense.

I claim:

1. A fender assembly for rapid removable attachment to a harness racing sulky of a variety having an arch extending between two spaced apart wheels, the arch having a curved portion extending downwardly to define a wheel support supporting such wheels at an outboard location, said sulky further including two, spaced apart elongate shafts, each extending from a connection with said arch adjacent each wheel for connection of the forward ends thereof with a harness, said assembly comprising:

a mount having an outboard first portion configured to be positioned in freely abutting relationship against said arch curved portion, having an inboard second portion of length to be extensible along said arch to adjacency with a said shaft, having a central portion configured for supporting a fender, and located intermediate said first and second portions, having a third portion fixed to said second portion and extending transversely with respect thereto, said third portion including a rearwardly depending hook configured to be positioned in freely abutting relationship with said arch adjacent said connection and having a forwardly extending stabilizer bar configured to be positioned in freely abutting adjacency with a portion of said shaft extending from said connection;

a first flexible connector for removably attaching said first portion with said arch curved portion;

a second flexible connector for removably attaching said third portion to said shaft portion; and a fender having an inner and outer surface defining a generally curved periphery corresponding to the circumference of a said wheel, connected with said mount at said central portion.

2. The fender assembly of claim 1 in which said first connector comprises:

a flexible polymeric strap extensible around said arch curved portion and attached to said mount first portion.

3. The fender assembly of claim 1 in which said second connector comprises a flexible polymeric strap extensible around said shaft portion and attached to said mount third portion forwardly extending stabilizer bar.

4. The fender assembly of claim 1 in which said mount third portion forwardly extending stabilizer bar is inclined upwardly from its connection with said second portion.

5. The fender of claim 1 in which said mount third portion hook is forwardly opening for abutting engagement with said arch and is formed having a widthwise extent greater than its thickness.

6. The fender of claim 1 in which said mount is formed of metal having a polymeric coating over the surface thereof.

7. The fender of claim 1 in which:

the upper and lower surface of said fender define a generally curvilinear cross-section thereof; and said mount central portion is configured to substantially conform to the inner surface of said fender.

8. The fender of claim 1 in which:

said first connector comprises a first flexible elongate polymeric strap having a linear array of apertures extending therethrough, and an upstanding first connector post having a retainer head and extending outwardly from said mount first portion, two of said apertures being flexibly positionable over said post to effect said attachment; and said second connector comprises a second flexible elongate polymeric strap having a linear array of apertures extending therethrough, and an upstanding second connector post having a retainer head and extending outwardly from said mount third portion forwardly extending stabilizer bar at a forward portion thereof, two of said apertures being flexibly positionable over said post to effect said attachment.

9. The fender of claim 1 in which said mount central portion extends above a said wheel a spacing effective to dispose said inner surface of said fender a predetermined distance from the outer surface of said wheel.

10. A method for removably attaching a fender to a harness racing sulky of a variety having an arch extending between said two spaced apart wheels, the arch having a curved portion at each side extending downwardly to provide a support for such wheels at an outboard location, said sulky further including two, spaced-apart elongate shafts, each extending from a connection with said arch adjacent each wheel for connection of the forward ends thereof with a harness, the method comprising the steps of:

(a) providing a fender assembly comprising a mount having an outboard first portion configured to abut against said arch curved portion, having an inboard second portion of length to be extensible along said arch to adjacency with a said shaft, having a central portion configured for supporting a fender and located intermediate said first and second portions, having a third portion fixed to said second portion and extending transversely with respect thereto, said third portion including a rearwardly depending hook and a forwardly extending stabilizer bar, a fender attached to said central portion, a first flexible strap connector attached to said mount first portion, and a second flexible strap connector attached to said third portion;

(b) engaging said mount third portion hook with said arch adjacent said connection;

(c) positioning said mount third portion stabilizer bar in abutting adjacency with a said shaft extending from said connection;

(d) fastening said mount third portion stabilizer bar to said shaft with said second flexible strap connector; and (e) fastening said mount first portion to said arch curved portion with said first flexible strap connector.

11. The method of claim 10 in which:

said mount third portion hook is provided as a forwardly opening hook;

said step (b) of engaging said mount third portion hook with said arch adjacent said connection is carried out by abuttably engaging said hook with a rearwardly disposed portion of said arch.

12. The method of claim 10 in which:

said first flexible strap connector is provided comprising an elongate flexible polymeric strap having a linear array of holes formed therein, and an upstanding first connector post fixed to and extending outwardly from said mount first portion; and said step (e) of fastening said mount first portion to said arch curved portion with said first flexible strap connector is carried out by placing one said hole of said strap over said first connector post, tightly wrapping said strap around said arch curved portion; and placing another said hole of said strap over said first connector post.

13. The method of claim 10 in which:

said second flexible strap connector is provided comprising an elongate flexible polymeric strap having a linear array of holes formed therein, and an upstanding second connector post fixed to and extending outwardly from said mount third portion stabilizer; and said step (d) of fastening said mount third portion stabilizer bar to said shaft with said second flexible strap connector is carried out by placing one said hole of said strap over said second connector post, tightly wrapping said strap around said shaft, and placing another said hole of said strap over said second connector post.

14. A fender assembly for a harness racing sulky of a variety having at least one bifurcate wheel support including a pair of downwardly-extending fork members including an outboard fork member and an inboard fork member spaced-apart to receive a wheel of a given circumference therebetween and an arcuate portion extending above the wheel intermediate the fork members, said assembly comprising:

a generally L-shaped mount connected to the wheel support to extend above the support a predetermined distance from the circumference of the wheel, said mount having an upper surface and a lower surface having an outboard generally upstanding first end fixed to said wheel support adjacent said outboard fork member and a transverse inboard second end attached to said wheel support over said inboard fork member and having a non-planer portion with a generally upwardly arching curvilinear upper surface extending between said first end and said second end, a hole extending through said non-planar portion, and a threaded retaining ring fixed to said lower surface in registry with said hole;

a fender having an inner and outer surface defining a generally curved periphery corresponding to the circumference of the wheel, and removably fastenable at a proximal end to the upper surface of said mount for rearward suspension over a portion of the circumference of the wheel from said proximal end to a freely-extending distal end;

the upper and lower surfaces of said fender defining a generally upwardly arching curvilinear surface corresponding with said mount non-planar portion upwardly arching upper surface, said fender having at least one aperture therethrough adjacent said proximal end for positioning in alignment with said mount hole; and a fastener for removably fastening said proximal end of said fender to the upper surface of said mount, said fastener extending through said fender aperture, through said mount hole and into threaded engagement with said retainer ring.

* * * * *